Sept. 24, 1946.　　　　　　E. G. BUSSE　　　　　　2,408,015
RAILWAY BRAKE BEAM
Filed Jan. 31, 1944　　　　　　2 Sheets-Sheet 1
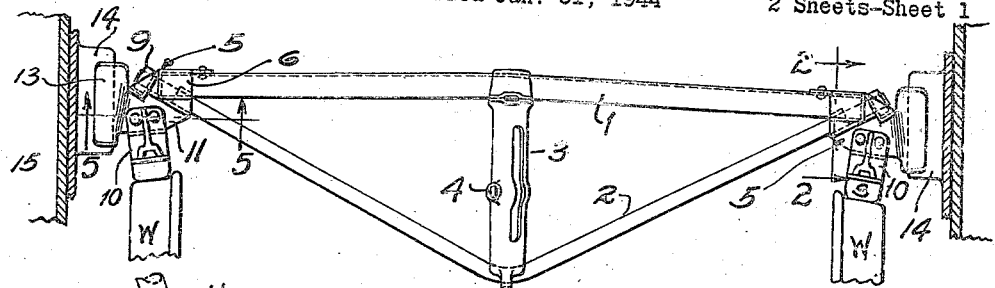
Fig. 1.
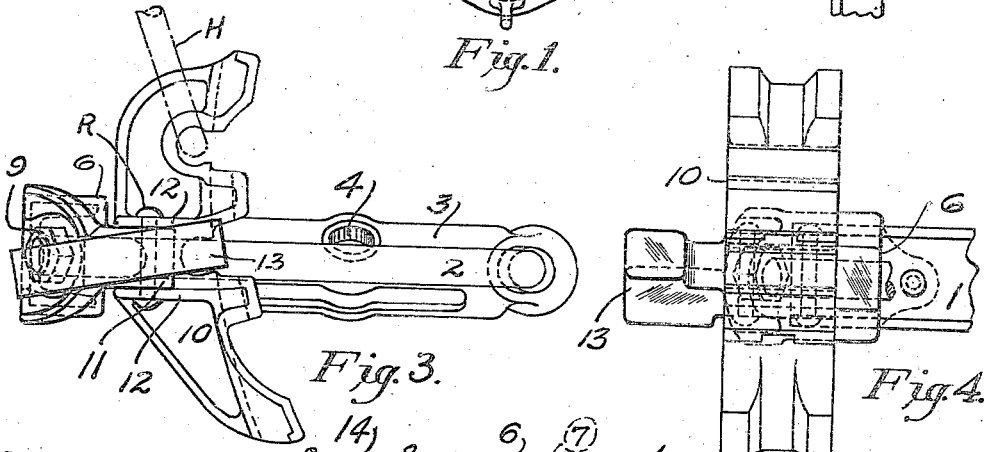
Fig. 3.
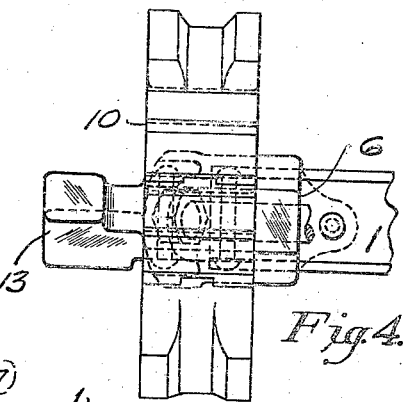
Fig. 4.
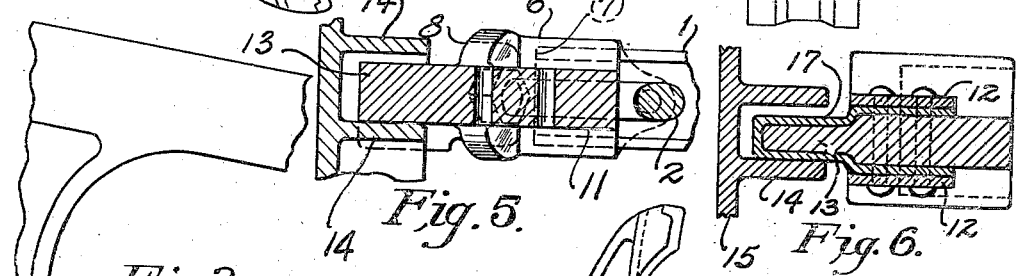
Fig. 5.
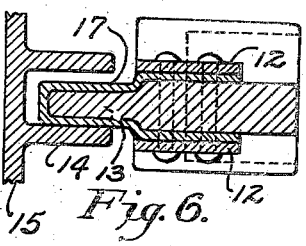
Fig. 6.
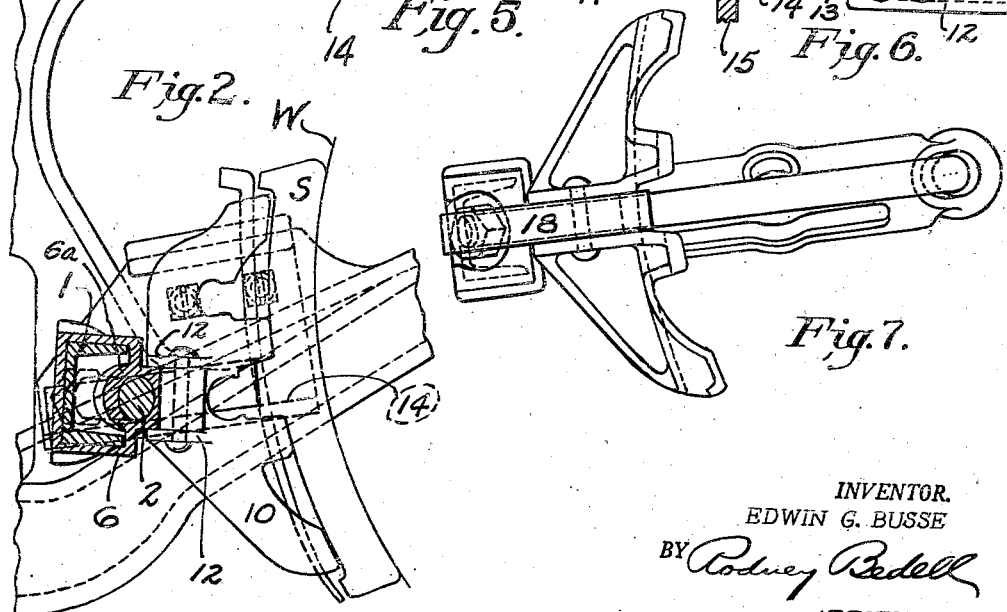
Fig. 2.
Fig. 7.
INVENTOR.
EDWIN G. BUSSE
BY Rodney Bedell
ATTORNEY Sept. 24, 1946.  E. G. BUSSE  2,408,015
RAILWAY BRAKE BEAM
Filed Jan. 31, 1944  2 Sheets-Sheet 2

INVENTOR.
EDWIN G. BUSSE.
BY Rodney Bedell
ATTORNEY

Patented Sept. 24, 1946

2,408,015

UNITED STATES PATENT OFFICE 2,408,015

RAILWAY BRAKE BEAM

Edwin G. Busse, Chicago, Ill., assignor to Chicago Railway Equipment Company, Chicago, Ill., a corporation of Illinois Application January 31, 1944, Serial No. 520,459

14 Claims. (Cl. 188—226)

The invention relates to railway brake beams of the built-up truss type and consists primarily in novel end structure for such beams.

Beams of the type referred to usually comprise a cambered compression member of channel-shape, U-shape or similar cross section, brake heads at the ends of the compression member each arranged for mounting a brake shoe and each having a pocket for receiving an end of the compression member, a strut at the middle of the beam apertured for the brake lever fulcrum, a tension member with its ends secured to the ends of the compression member either directly or through the brake heads or other thrust block elements.

It has long been a general practice to suspend the brake beam from the brake frame by swing hangers, the lower ends of which are received in recesses provided therefor in the brake head and the upper ends of which are seated in brackets on the truck frame.

Another manner of supporting the brake beam is to provide the side frame with a bracket adjacent to the end of the beam and underlying a part of the beam to slidingly support the beam during application and release of the brake. The bracket may engage a portion of the beam compression member spaced inwardly from the brake head, as shown in Patent 2,197,785, issued April 23, 1940, to the present applicant, and in D. M. Light Patent 2,201,441, issued May 21, 1940; or may engage an integral extension of the brake beam compression member, as shown in a copending application by the present applicant filed July 8, 1942, Serial No. 450,154; or by an extension on the tension member or its nut or by an extension on the brake head, as shown in Patents 2,226,551, issued December 31, 1940, and 2,254,514, issued September 2, 1941, both to the present applicant. Each of these arrangements involves a special construction of the compression member of the brake beam.

The main object of the present invention is to afford a simple, effective support from the truck frame for the end of a built-up truss type brake beam having the usual compression member and tension member and, in some forms of the invention, the brake head. This object may be attained by providing a separate thrust block for the end of the brake beam adapted to seat the compression member and the brake head and the tensioning device on the tension member and to engage the supporting bracket. Additional objects of the invention are to correlate the end of the beam, supported as indicated above, with the brake heads so as to facilitate the assembly and replacement of the head, without disassembling the beam, and to accommodate support of the beam by swing hangers in the usual manner if the intended support from the side frame is not available.

Other detail objects as will appear below are attained by the structure, selected forms of which are illustrated in the accompanying drawings in which—

Figure 1 is a plan view of a brake beam of the type referred to showing adjacent portions of the truck side frames and beam supporting brackets and of the wheels to which the brake is applied.

Figure 2 is a vertical transverse portion through the beam and showing the adjacent portion of the side frame and is taken approximately on the line 2—2 of Figure 1.

Figure 3 is an end view of the beam.

Figure 4 is a front view of one end of the beam.

Figure 5 is a detail longitudinal section through the end of the beam and the adjacent portion of the supporting bracket and is taken approximately on the line 5—5 of Figure 1.

Figure 6 illustrates the detail of a wear plate preferably applied to the end member but omitted from the other views to avoid confusion.

Figure 7 is an end view corresponding to Figure 3 but illustrating another form of the invention.

Figure 8:
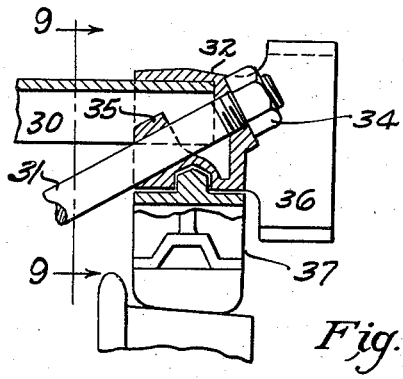
Figure 8 is a horizontal section of one end of a brake beam and illustrates another form of the invention.

In the arrangement shown in Figures 1-6 the beam compression member 1 is of channel section. The tension rod 2 comprises a round bar. Strut 3 is a casting or forging having apertures 4 for seating the brake lever fulcrum pin (not shown). Assembled with the converging beam tension and compression members are end members 5 each having a pocket-forming portion 6 open at one side to receive the end of the compression member which is seated against the inner face 7 of the pocket. The outer face 8 of the pocket structure seats a tensioning nut 9 threaded on the end portion of the tension member. The end member includes a sleeve 6a (Figure 2) which surrounds the adjacent portion of the tension member, thereby preventing flexing of the tension member about its threaded portion and prolonging the useful life of the tension member and the beam, as disclosed in E. G. Busse Patent 2,319,440, issued May 18, 1943.

A flange structure projects from the end member pocket structure and includes a portion 11 for mounting the brake head 10 which has vertically spaced jaws receiving the flange portion 11 between them. Vertically disposed rivets R secure the brake head to the end member independently of the beam tension and compression members.

The flange has an end portion 13 projecting longitudinally of the beam beyond the ends of the tension and compression members and beyond the side of the brake head and adapted to be received between brackets 14 projecting inwardly from the adjacent truck side frame 15 and to slide on the brackets transversely of the beam whereby the beam is supported and guided in its movement towards and from the truck wheels. Various arrangements of the side frame support elements are illustrated and described in an application filed by the present inventor, Serial No. 503,865, issued as Patent No. 2,383,955 on Sept. 4, 1945. If preferred, the beam supporting element on the side frame may be integral with the side frame.

Preferably flange portions 11 and 13 of the end device are disposed angularly to each other so that the head mounting portion 11 is positioned in the same general horizontal plane as the beam members 1, 2 and 3, whereby the beam is adapted to receive the braking force applied horizontally by the usual brake pull rods, bottom connections, etc., while the support-engaging flange portion 13 is inclined at an angle of approximately 12° so that the beam moves along a radius of the wheel W as the brake shoes S are applied to the wheels, thus avoiding a twisting moment in the beam tension and compression and head members when the beam as a whole is inclined from the horizontal. This gives the beam greater strength for a given size and weight of material.

Preferably the support engaging portion 13 of the thrust block is provided with a renewable wear plate 17 to extend the useful life of the beam, and the application of this wear plate may be facilitated by extending it under the brake head jaws 12 (see Figure 6).

In an emergency, or if the beam is applied to a truck frame without the brackets opposite the ends of the beam, the beam may be suspended by a conventional hanger H.

Figure 7 illustrates another form of the invention in which the support engaging portion 18 of the thrust block flange is disposed in the same general plane as the brake head mounting flange and the beam compression member, tension member and strut, which arrangement may be preferable if the line of thrust of the brake force on the brake beam is inclined or if the twisting moment resulting from the application of the brake force horizontally and the movement of the brake beam along an incline is not objectionable.

Figures 9, 10:
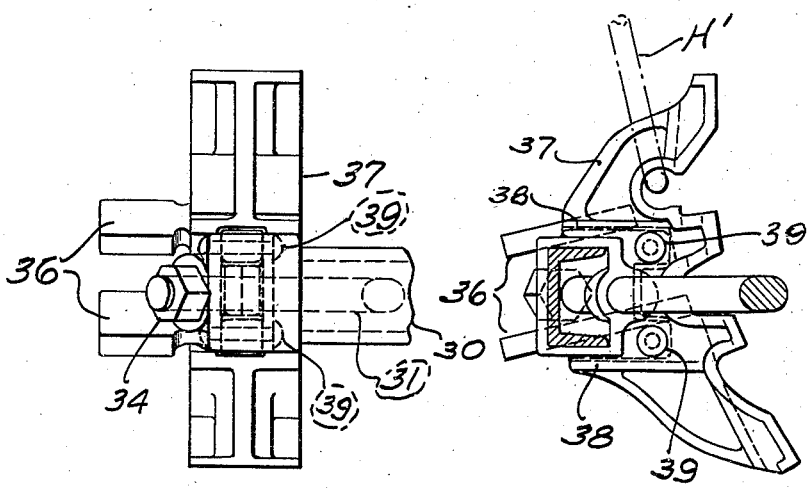
Figure 9 is a vertical section taken on line 9—9 of Figure 8.
Figure 10 is a rear view of the structure shown in Figures 8 and 9.

Figures 8–10 illustrate another form of the invention in which the channel compression member 30 and the round rod tension member 31 correspond to those shown in Figures 1–6. The beam end member 32, similar to the end member previously described, has an inner seat for the end of the compression member and an outer seat, for the tension member nut 34, and a sleeve 35 for holding the tension member against flexing about its threaded end. The end member has a pair of vertically spaced flanges 36 extending from its closed side lengthwise of the beam beyond nut 34 on the tension member and spaced above and below the same and inclined to the general plane of the beam to receive between them supporting bracket structure (not shown) on the adjacent portion of the truck frame similarly to the arrangement shown in Figures 1–6.

The brake head 37 is carried by end member 32 but is mounted directly upon the box-like body portion of the end member, the brake head jaws 38 being spaced apart vertically a greater distance than the jaws 12 in the head previously described and extending over the top and bottom walls of the end member pocket structure which receives the end portions of the beam tension and compression members. The head is secured to the end member by horizontally disposed rivets 39 and the details of this head and end member assembly are further illustrated, described and claimed in a copending application by the present inventor, Serial No. 521,011, filed February 4, 1944.

It will be understood that the details of the structures may be varied in other ways than those shown without departing from the spirit of the invention and that some of the features described may be used without necessarily including all of the features described. It is contemplated, for example, that wear plates similar to those shown in Figure 6 may be provided in each form of the invention and that each of the brake heads may receive the hanger in a top recess, as indicated at H and H', or may receive the hanger in a central recess in the well known manner when the beam is applied to a truck frame having the usual brake hanger bracket but not provided with support and guide brackets opposite to the end of the beam. Exclusive use of those modifications coming within the scope of the claims is contemplated.

What is claimed is:

1. In a railway truss type brake beam having a compression member and a tension member converging at the end of the beam with the tension member extending diagonally through the end portion and beyond the end of the compression member, an end device having a pocket receiving the end portions of said members, a tensioning device on the tension member holding the same and the device and the compression member in assembled relation with each other and having a structure projecting beyond said pocket to form a seat for a brake head and extending longitudinally and transversely of the beam beyond said seat and arranged to slidably engage a support on an adjacent truck part.

2. A brake beam as described in claim 1 in which the support-engaging structure is inclined from the general plane of the compression and tension members so as to move the beam transversely of its general plane as the support-engaging structure slides over a support inclined to the general plane of the beam.

3. A brake beam as described in claim 1 in which the support-engaging structure comprises vertically spaced flanges arranged to receive a support flange between them.

4. In a railway truss type brake beam having a compression member and a tension member converging at their ends, an end device having a pocket structure mounted on the adjacent ends of said members and having a flange extending longitudinally of the beam beyond the ends of the compression and tension members to slidably engage a supporting bracket, and also extending forwardly from the pocket structure, a tensioning element seated against the end device and holding the latter and said members assembled, and a brake head spaced inwardly of the beam from the support-engaging portion of the flange and having a rearwardly opening jaw receiving said flange to mount the head.

5. A brake beam as described in claim 4 in which the portion of the flange projecting beyond the end of the beam tension and compression members is there twisted from the general plane of the beam to slidably engage a similarly inclined support.

6. In a railway truss type brake beam, a compression member, a tension member provided with a tensioning element, said members being positioned in the same general plane, an end device having a pocket-forming portion receiving the ends of said members and having seats extending transversely of said plane and facing in opposite directions and arranged to engage said tensioning element and the end of said compression member respectively and having a flange forwardly of the end portions of said members and positioned in said plane, and a brake head having an open ended jaw receiving said flange and secured thereto.

7. In a railway truss type brake beam, a compression member, a tension member provided with a tensioning device, an end device having oppositely facing seats for the end of the compression member and for the tensioning device and also forming a seat for a brake head, and a brake head mounted on said latter-mentioned seat, said end device having a flange projecting lengthwise of the beam beyond the ends of said members and beyond the side of said head and extending transversely of the beam beyond the head mounting seat and arranged to slidably engage an element on the adjacent part of a truck frame to support the beam.

8. In a railway truss type brake beam, a compression member, a tension member provided with a tensioning device, an end device having seats for the end of the compression member and for the tensioning device, and a brake head mounted on said end device and in line with said tensioning device, transversely of the beam, said end device having a flange projecting lengthwise of the beam beyond the ends of said members and beyond the side of said head and extending transversely of the beam beyond the ends of said members and arranged to slidably engage an element on the adjacent part of a truck frame to support and guide the beam as the brakes are applied and released.

9. In a railway truss type brake beam, a compression member, a tension member provided with a tensioning device, an end device having a seat for the end of the compression member and a seat for the tensioning device and a seat for a brake head, and a brake head mounted on said latter-mentioned seat in line with said tensioning device transversely of the beam, said end device having a flange projecting lengthwise of the beam beyond the ends of said members and beyond the side of said head and elongated transversely of the beam beyond the seat for the head to provide extended downwardly and upwardly facing surfaces arranged to slidably engage vertically spaced upwardly and downwardly facing surfaces on the adjacent part of a truck frame to support and guide the beam in its movement towards and away from the truck wheels.

10. A brake beam as described in claim 7 in which the compression member and tension member are positioned in a common plane and the projecting flange on the end device is inclined at an angle to said plane whereby the beam as a whole may be disposed horizontally but may be raised and lowered as it slides along the support on the truck frame.

11. A railway brake beam end member comprising a pocket structure open at one end for receiving the converging end portions of the compression and tension members of a truss type brake beam, its other end being apertured for the passage therethrough of the tension member of the beam, and forming a seat for a tensioning device on the tension member, there being a part projecting from the pocket structure forming a seat for a brake head and forming a relatively wider flange projecting longitudinally and transversely of said pocket structure beyond said head seat and arranged to support the beam upon an adjacent truck part.

12. A railway brake beam end member as described in claim 11 in which the support engaging portion of the flange is disposed at an angle to the head mounting portion of the flange so as to move the beam transversely of its general plane as the brakes are applied and released.

13. A railway brake beam end member comprising a pocket structure open at one end for receiving the converging end portions of the compression and tension members of a truss type brake beam, a wall at the opposite end of the pocket structure, one side of which wall forms a seat for the end of the compression member and the other side of which wall forms a seat for a tension device on the tension member, and flange structure projecting beyond said outer seat and forming a brake head mounting, insertable transversely of a brake head between its jaws, and a relatively wider terminal for engaging a support on an adjacent truck part.

14. A railway brake beam end member as described in claim 13 which includes a flange extending from the front of the pocket structure in a plane extending lengthwise of the pocket structure and arranged to mount a brake head.

EDWIN G. BUSSE.